(12) United States Patent
Kim et al.

(10) Patent No.: US 10,710,538 B2
(45) Date of Patent: Jul. 14, 2020

(54) SEATBELT AIRBAG FOR VEHICLE

(71) Applicants: Hyundai Motor Company, Seoul (KR); Kia Motors Corporation, Seoul (KR)

(72) Inventors: Young Hwan Kim, Gyeonggi-do (KR); Choong Sik Shin, Gyeonggi-do (KR); Soo Chul Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 163 days.

(21) Appl. No.: 15/962,749

(22) Filed: Apr. 25, 2018

(65) Prior Publication Data

US 2019/0176738 A1    Jun. 13, 2019

(30) Foreign Application Priority Data

Dec. 13, 2017    (KR) .......................... 10-2017-0170861

(51) Int. Cl.
| | |
|---|---|
| *B60R 21/18* | (2006.01) |
| *B60R 22/14* | (2006.01) |
| *B60R 22/34* | (2006.01) |
| *B60R 21/264* | (2006.01) |
| *B60R 21/261* | (2011.01) |
| *B60R 22/18* | (2006.01) |

(52) U.S. Cl.
CPC ............ *B60R 21/18* (2013.01); *B60R 21/261* (2013.01); *B60R 21/264* (2013.01); *B60R 22/14* (2013.01); *B60R 22/18* (2013.01); *B60R 22/34* (2013.01); *B60R 2021/2612* (2013.01); *B60R 2022/1818* (2013.01)

(58) Field of Classification Search
CPC ................................. B60R 21/18; B60R 22/26
See application file for complete search history.

(56) References Cited

U.S. PATENT DOCUMENTS

| 3,933,370 | A | * | 1/1976 | Abe | ........................ | B60R 21/18 |
| | | | | | | 280/733 |
| 6,126,194 | A | * | 10/2000 | Yaniv | ...................... | B60R 21/18 |
| | | | | | | 280/728.1 |
| 6,382,666 | B1 | * | 5/2002 | Devonport | .............. | B60R 21/18 |
| | | | | | | 280/730.1 |
| 7,413,220 | B2 | * | 8/2008 | Itoga | ..................... | B60R 21/231 |
| | | | | | | 180/268 |
| 2002/0105176 | A1 | * | 8/2002 | Hammer | ................. | B60R 21/18 |
| | | | | | | 280/733 |
| 2002/0125701 | A1 | * | 9/2002 | Devonport | .............. | B60R 21/18 |
| | | | | | | 280/733 |

(Continued)

FOREIGN PATENT DOCUMENTS

KR    20-0325045 Y1    9/2003

*Primary Examiner* — James A English
(74) *Attorney, Agent, or Firm* — Mintz Levin Cohn Ferris Glovsky and Popeo, P.C.; Peter F. Corless

(57) ABSTRACT

A seatbelt airbag for a vehicle is provided. The airbag is inflated in a seatbelt to restrain an occupant to reduce an injury to the occupant caused by the seatbelt. Particularly, since the airbag is locally inflated at occupant's shoulder and hip which are susceptible to injury by the seatbelt, an inflation speed is controlled, an impact is minimized, and the occupant may be restrained in the seat more rapidly and stably.

11 Claims, 7 Drawing Sheets

(56) References Cited

U.S. PATENT DOCUMENTS

2002/0171233 A1* 11/2002 Grace ..................... B60R 21/18
  280/733
2005/0067820 A1    3/2005 Keeslar et al.
2015/0343931 A1* 12/2015 Koike .................... B60N 2/688
  297/468
2016/0280171 A1*  9/2016 Moeller ................. B60R 21/18

* cited by examiner

SEATBELT AIRBAG FOR VEHICLE

CROSS REFERENCE TO RELATED APPLICATION

The present application claims priority of Korean Patent Application No. 10-2017-0170861 filed on Dec. 13, 2017, the entire contents of which is incorporated herein for all purposes by this reference.

BACKGROUND

Field of the Invention

The present invention relates to a seatbelt airbag for a vehicle, and more particularly, to a seatbelt airbag that applies an airbag cushion to a seatbelt to restraint an occupant in a seat to minimize an injury to the occupant.

Description of the Related Art

In general, a vehicle includes a plurality of seats for providing occupants with a comfortable ride quality, and each of the seats includes a seatbelt that restrains an occupant in the seat to ensure occupant's safety in the event of vehicle collision. However, when the upper body of an occupant is fixed by the seatbelt, the occupant may be injured by the pressure of the seatbelt since the seatbelt forcible restrains the occupant in the event of vehicle collision.

The foregoing is intended merely to aid in the understanding of the background of the present invention, and is not intended to mean that the present invention falls within the purview of the related art that is already known to those skilled in the art.

SUMMARY

Accordingly, the present invention provides a seatbelt airbag for a vehicle, which is inflated within a seatbelt to restrain an occupant to minimize an injury to the occupant caused when the seatbelt presses against the occupant.

In accordance with an aspect of the present invention, a seatbelt airbag for a vehicle may include a cushion housing installed at an upper portion of a seat back and having a seatbelt that extends from a shoulder area of an occupant across a chest thereof to a hip thereof, and an airbag cushion mounted within the cushion housing, deployed along the seatbelt by gas supplied from an inflator thereto, and having a plurality of chambers that correspond to the shoulder and hip of the occupant to prevent the seatbelt from coming into direct contact with the shoulder and hip of the occupant in the event of vehicle collision.

The seatbelt may have a first end connected to a retractor installed at a rear lower portion of the seat back and thus, the seatbelt may be wound by the retractor. Additionally, a second end of the seatbelt may be formed with a tongue to fasten the seatbelt to a buckle installed at a front lower portion of the seat back. The cushion housing may include an inner case fixedly installed at the upper portion of the seat back and connected with the seatbelt to guide an extension path of the seatbelt, and a front case coupled to a front surface of the inner case, the airbag cushion being mounted within the front case in a foldable manner and being opened at a front surface thereof when the airbag cushion is deployed.

Further, the inner case may be formed with a guide ring to which the seatbelt is latched while passing therethrough, and a rear case may be coupled to the rear of the inner case and thus, the inner case may be covered by the front and rear cases to prevent exposure to the outside. The front case may have an opening aperture that is open in forward and backward directions for passing the seatbelt therethrough, and an interior space in which the airbag cushion may be mounted in a foldable manner around the opening aperture, and a tear line may be formed on a front end surface of the interior space and thus, the airbag cushion may be deployed forward by tearing the tear line in the deployment of the airbag cushion.

The airbag cushion may include a guide tube mounted within the cushion housing and deployed along the seatbelt by gas supplied from the inflator thereto to surround the seatbelt, and first and second chambers connected to the guide tube to communicate therewith to be inflated by gas supplied from the guide tube thereto, and positioned corresponding to the respective shoulder and hip of the occupant when the guide tube is deployed along the seatbelt. The first chamber may be positioned in front of the shoulder of the occupant in the guide tube, the second chamber may be positioned in front of the hip of the occupant in the guide tube, and the first and second chambers may be connected to the guide tube to communicate therewith through respective vent apertures.

The guide tube may be hollow with a first end connected to the inflator for supply of gas from the inflator to the guide tube and a second end closed. The inflator may be installed on a rear surface of the seat back, and may include a gas distribution passage that extends from the inflator to be connected to the guide tube for supply of gas to the guide tube within the cushion housing.

The airbag cushion may include a distribution tube mounted within the cushion housing and deployed along the seatbelt by gas supplied from the inflator thereto to surround the seatbelt, a third chamber connected to the distribution tube to communicate therewith to be inflated by gas supplied from the distribution tube thereto, and positioned in front of the hip of the occupant, and a fourth chamber connected to the distribution tube to be inflated by gas supplied from the inflator thereto, and positioned in front of the shoulder of the occupant.

Further, the inflator may be installed on a rear surface of the seat back, and may include a first gas distribution passage that extends from the inflator to be connected to the guide tube within the cushion housing, and a second gas distribution passage that branches from the first gas distribution passage to be connected to the fourth chamber. The inflator may include a second gas distribution passage that branches and extends from a first gas distribution passage into a plurality of passages, and the branched passages may be connected around the fourth chamber in a separate state.

As apparent from the above description, the seatbelt airbag for a vehicle having the above-mentioned structure may be inflated within the seatbelt to restrain an occupant to reduce an injury to the occupant caused by the seatbelt. Particularly, since the airbag is locally inflated at the occupant's shoulder and hip which may be seriously injured by the seatbelt, it may be possible to control an inflation speed, minimize an impact, and rapidly and stably restrain the occupant in the seat.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

A seatbelt airbag for a vehicle according to the exemplary embodiments of the present invention will be described below with reference to the accompanying drawings.

Figure 1:
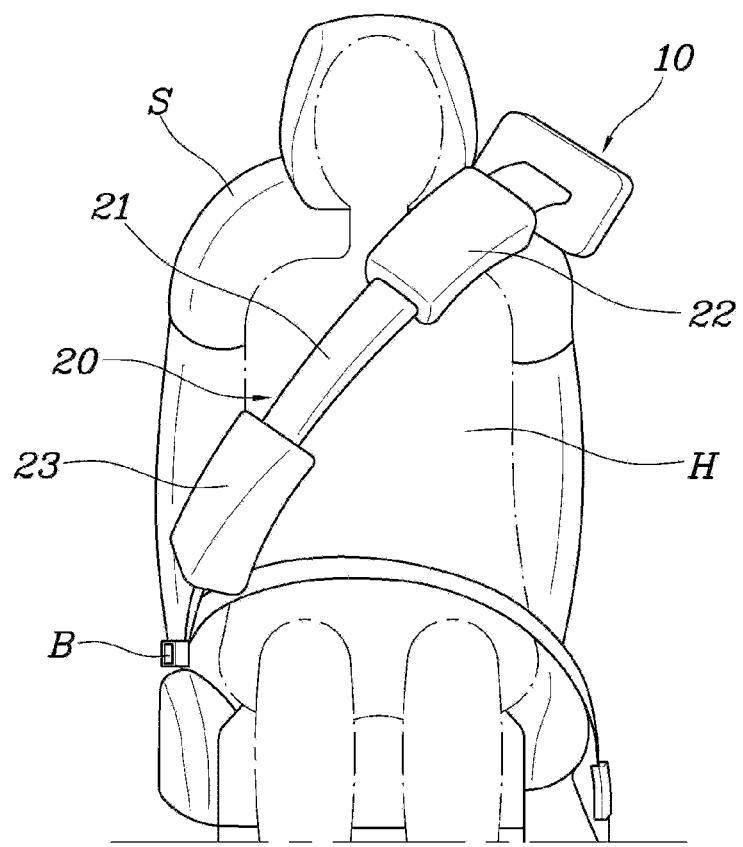
FIG. 1 is a view illustrating a seatbelt airbag for a vehicle according to a first exemplary embodiment of the present invention.
Figure 2:
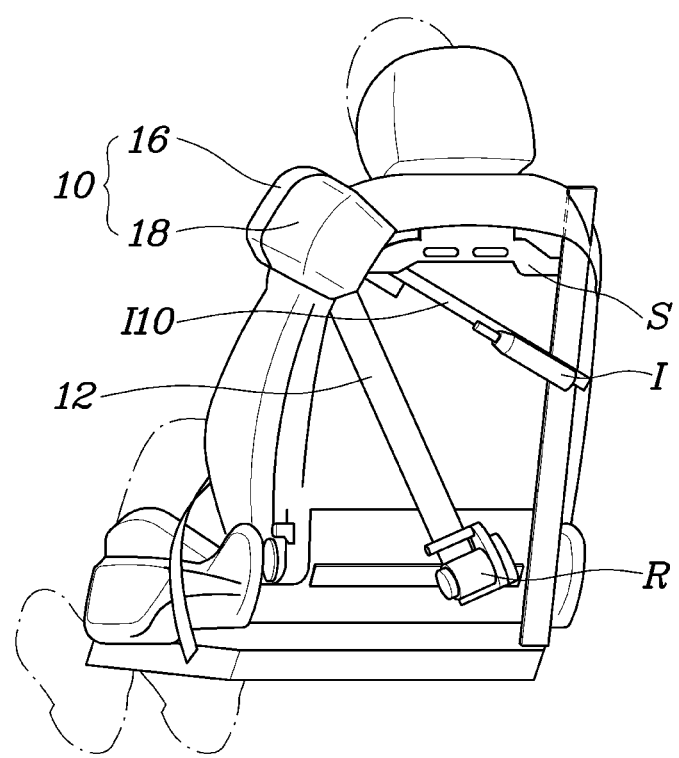
FIGS. 2 to 4 are views for explaining the seatbelt airbag for a vehicle illustrated in FIG. 1 according to the first exemplary embodiment of the present invention.
Figure 3:
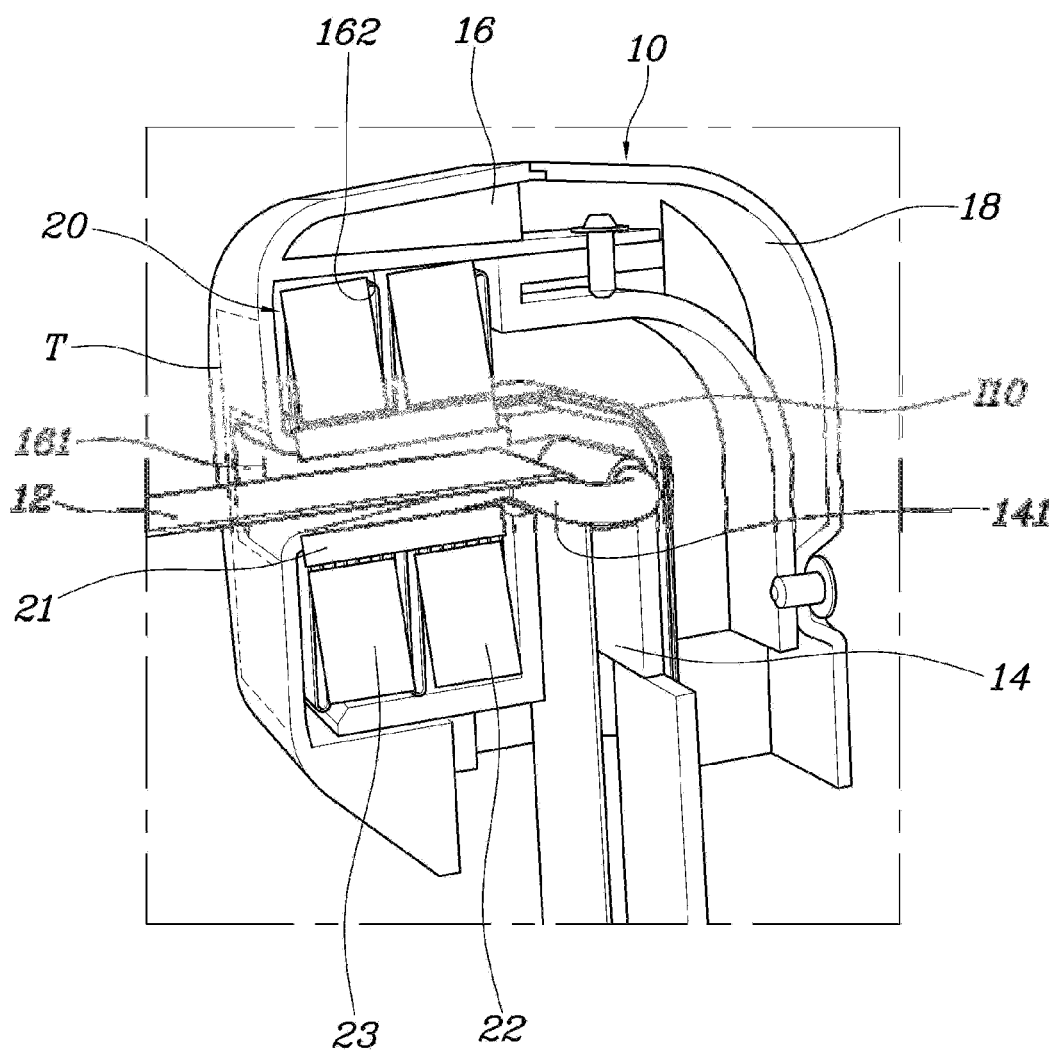
Figure 4:
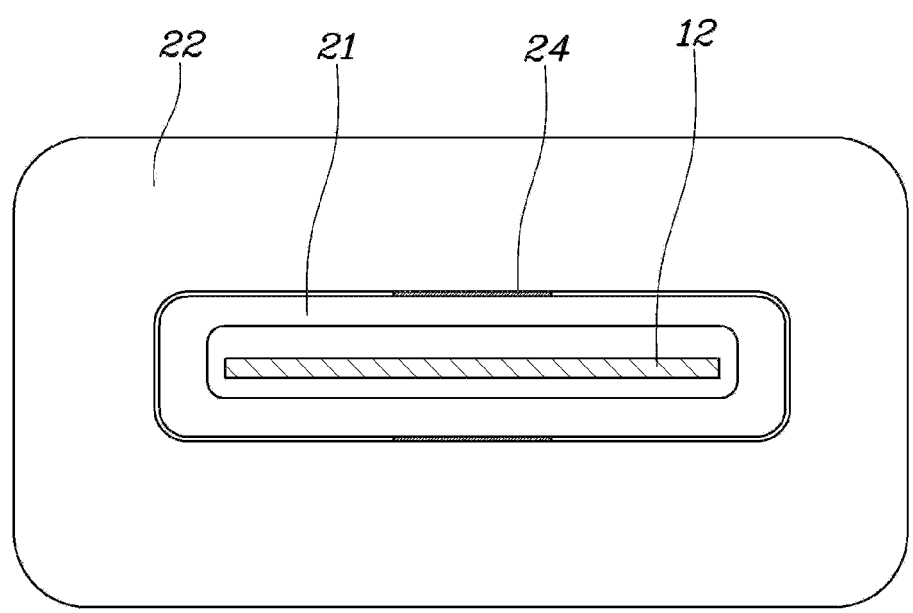
Figure 5:
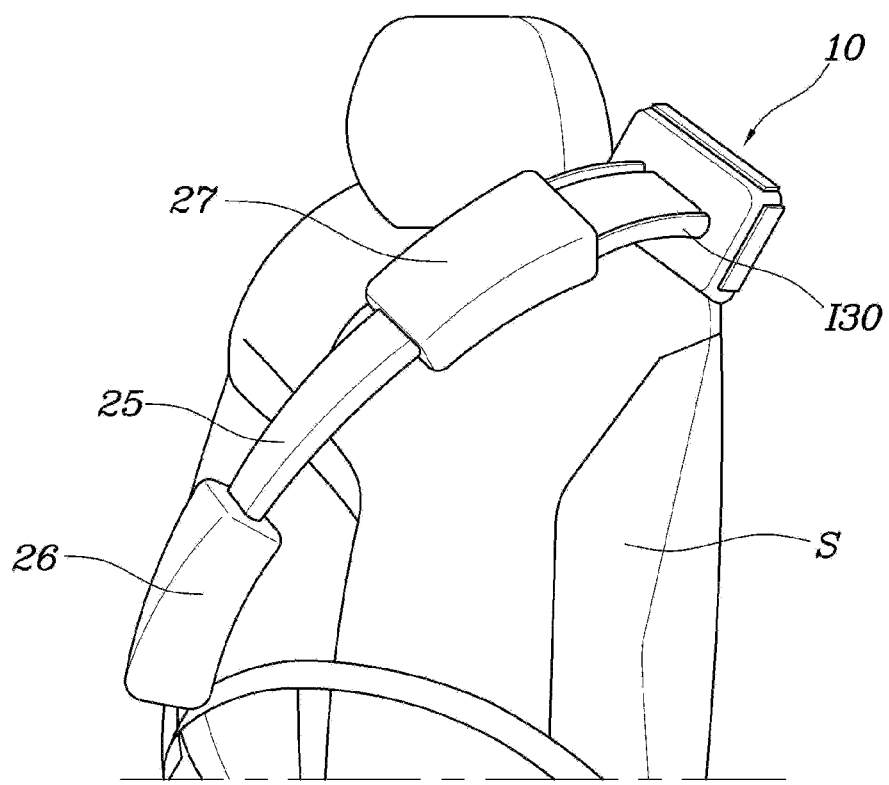
FIG. 5 is a view illustrating a seatbelt airbag for a vehicle according to a second exemplary embodiment of the present invention.
Figure 6:
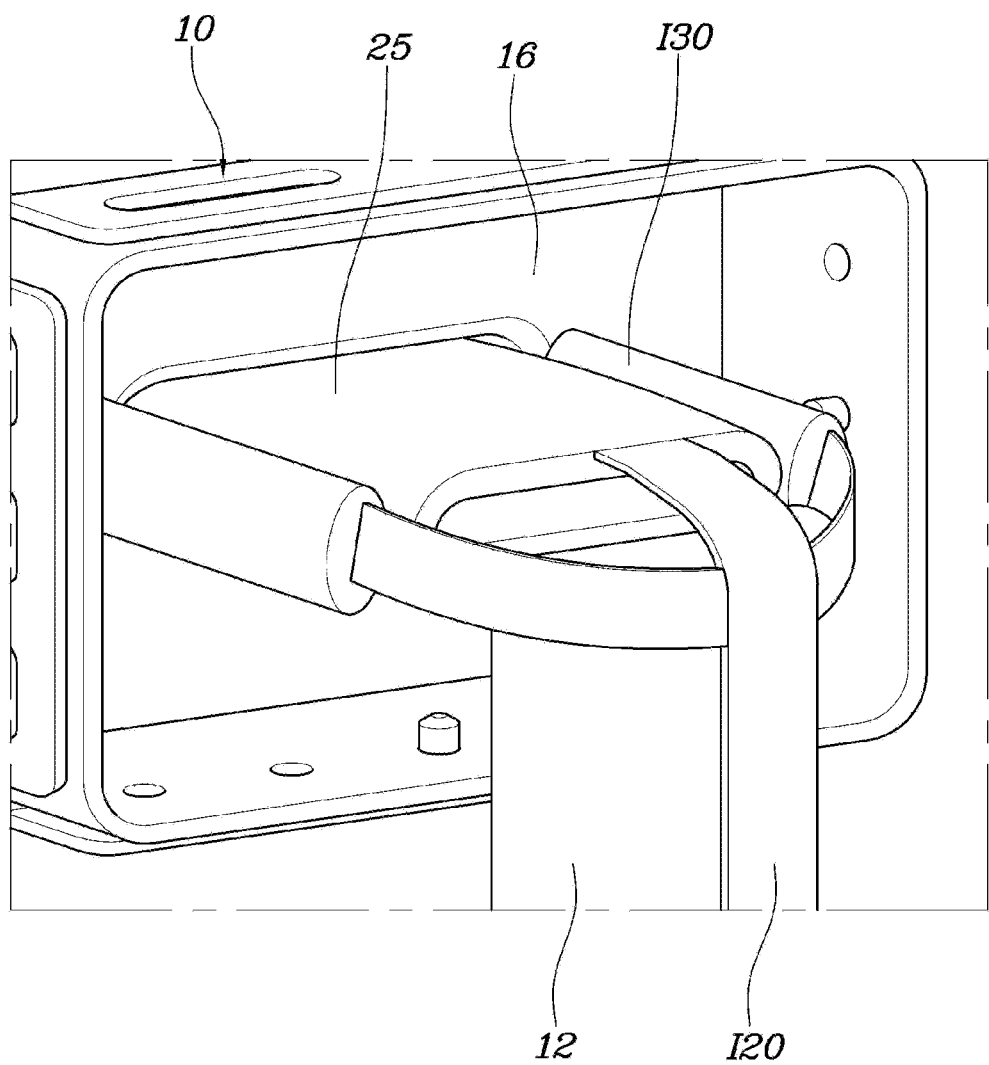
FIGS. 6 and 7 are views for explaining the seatbelt airbag for a vehicle illustrated in FIG. 5 according to the second exemplary embodiment of the present invention.
Figure 7:
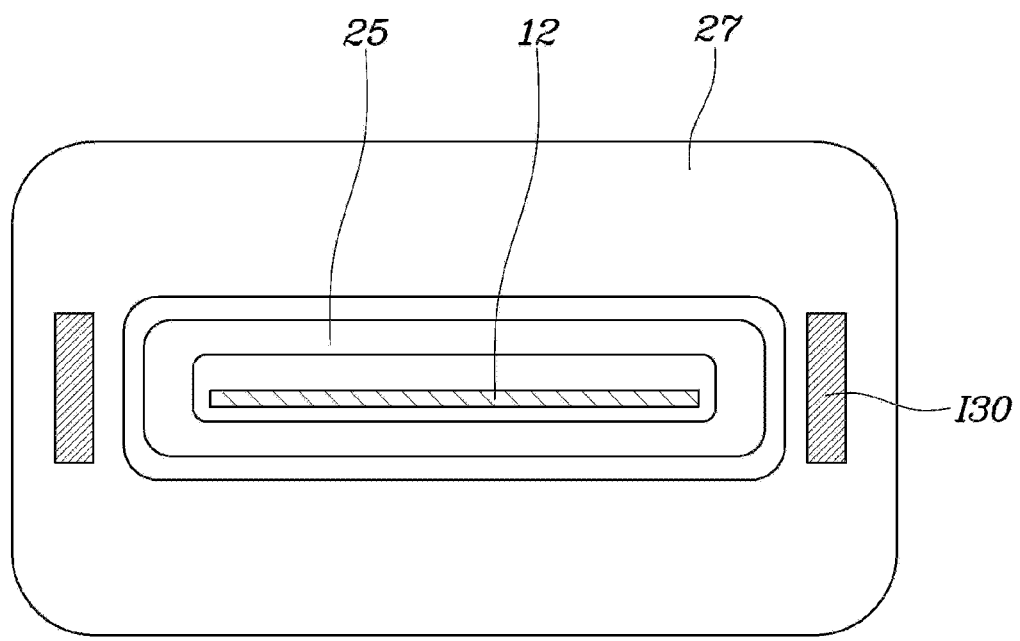

FIG. 1 is a view illustrating a seatbelt airbag for a vehicle according to a first exemplary embodiment of the present invention. FIGS. 2 to 4 are views for explaining the seatbelt airbag for a vehicle illustrated in FIG. 1. FIG. 5 is a view illustrating a seatbelt airbag for a vehicle according to a second exemplary embodiment of the present invention. FIGS. 6 and 7 are views for explaining the seatbelt airbag for a vehicle illustrated in FIG. 5.

As illustrated in FIGS. 1 and 2, the seatbelt airbag for a vehicle according to the present invention may include a cushion housing 10 installed at the upper portion of a seat back S and having a seatbelt 12 that extends from the shoulder of an occupant H across the chest thereof to the hip thereof (e.g., extends diagonally across the seat back on which an occupant is seated), and an airbag cushion 20 mounted within the cushion housing 10 and deployed along the seatbelt 12 by the gas supplied thereto from an inflator I. The airbag cushion 20 may include a plurality of chambers that correspond to the shoulder and hip of the occupant H (e.g., to different areas of vulnerability) to prevent the seatbelt 12 from coming into direct contact with the shoulder and hip of the occupant H in the event of vehicle collision.

Accordingly, the cushion housing 10 may be installed at the upper portion of the seat back S, and the seatbelt 12 may be withdrawn from the cushion housing 10 to extend from the shoulder of the occupant H across the chest thereof to the hip thereof (e.g., diagonally across the seatbelt). The seatbelt 12 may have a first end connected to a retractor R installed at the rear lower portion of the seat back S and thus, the seatbelt 12 may be wound by the retractor R, and may have a second end formed with a tongue to fasten the seatbelt 12 to a buckle B installed at the front lower portion of the seat back S. In particular, the cushion housing 10 may be positioned near (e.g., proximate to) a vehicle body in the upper portion of the seat back S. The cushion housing 10 may be positioned at the left upper portion of the seat back S when the seat is a left seat within a vehicle, whereas it may be positioned at the right upper portion of the seat back S when the seat is a right seat within the vehicle. Thus, the occupant H may be restrained by the seatbelt 12 that extends from the cushion housing 10 when the occupant H is positioned on the seat.

Further, the airbag cushion 20 may be mounted within the cushion housing 10 to be deployed along the seatbelt 12 by the gas supplied from the inflator I thereto. Particularly, the airbag cushion 20 may include the plurality of chambers that correspond to the shoulder and hip of the occupant H to locally support the shoulder and hip of the occupant H. In other words, a substantial amount of force may be exerted onto the shoulder and hip of the occupant H due to the characteristics of the seatbelt 12 when the occupant H moves forward while restrained by the seatbelt 12. Accordingly, it may be possible to minimize an injury to the occupant H caused when the occupant H is restrained by the seatbelt 12 since the shoulder and hip of the occupant H are locally supported when the airbag cushion 20 is deployed. However, the present invention is not limited thereto and other areas of the occupant may be protected based on a risk of injury due to pressured exerted from the seatbelt during a vehicle collision. In addition, it may be possible to secure or control an inflation speed since the chambers are locally inflated only in the shoulder and hip of the occupant H.

The present invention will be described in detail below. As illustrated in FIG. 3, the cushion housing 10 may include an inner case 14 fixedly installed at the upper portion of the seat back S and connected with the seatbelt 12 to guide an extension path of the seatbelt 12, and a front case 16 coupled to the front surface of the inner case 14, equipped with the airbag cushion 20 in a foldable manner, and opened at the front surface thereof when the airbag cushion 20 is deployed. In other words, the inner case 14 may be installed at the upper portion of the seat back S and may be fixed to a seat back frame by separate bolting members (e.g., bolts or other fastening mechanism). The inner case 14 may be formed to guide the extension path of the seatbelt 12 while the seatbelt 12 passes through the inner case 14, thereby allowing the seatbelt 12 to extend forward.

Additionally, the front case 16 may be coupled to the front surface of the inner case 14 by bolting members. Particularly, the front case 16 may include the airbag cushion 20 mounted therein in a foldable manner and the front case 16 may be opened when the airbag cushion 20 is deployed in the state in which the front surface of the front case 16 is closed. Thus, when gas is supplied from the inflator I to the airbag cushion 20, the airbag cushion 20 may be deployed forward by penetrating the front surface of the front case 16 in the state in which the airbag cushion 20 is mounted within the front case 16. In particular, the inner case 14 may be formed with a guide ring 141 to which the seatbelt 12 may be latched while passing therethrough. A rear case 18 may be coupled to the rear of the inner case 14 and thus, the inner case 14 may be covered by the front case 16 and the rear case 18 to prevent exposure to the outside.

As illustrated in FIG. 3, the guide ring 141 formed in the inner case 14 may formed in a "D" shape to allow the seatbelt 12 to move from down to up and then be bent forward by the guide ring 141. The guide ring 141 may include a roller to restrain the seatbelt 12 passing through the guide ring 141 from moving due to a gap between ends of the guide ring 141. The seatbelt 12 may be smoothly moved by rotation of the roller.

The rear case 18 may be coupled to the rear of the inner case 14. In addition, the rear case 18 may be coupled to the inner case 14 by bolts, and the inner case 14 may be prevented from being exposed to the outside when the front and rear cases 16 and 18 are coupled to the inner case 14. Thus, the external appearance of the cushion housing 10 may be determined according to the shapes of the front and rear cases 16 and 18. Since the inner case 14 is not exposed to the outside by the front and rear cases 16 and 18, it may be possible to prevent contamination and improve aesthetics.

Further, the front case 16 may include an opening aperture 161 that is open in forward and backward directions for passing the seatbelt 12 therethrough, and an interior space 162 in which the airbag cushion 20 may be mounted in a foldable manner around the opening aperture 161. A tear line T may be formed on the front end surface of the interior space 162 and thus, the airbag cushion 20 may be deployed forward by tearing the tear line T when it is necessary to deploy the airbag cushion 20.

In other words, the front case 16 may include the opening aperture 161 formed in the center thereof and thus, the seatbelt 12 may be maintained in the state in which it passes through the opening aperture 161. The front case 16 has the interior space 162 in which the airbag cushion 20 may be mounted in a foldable manner around the opening aperture 161. Particularly, since the tear line T may be formed on the front end surface of the interior space 162, the airbag cushion 20 may be deployed forward by tearing the tear line T formed on the front end surface of the interior space 162 when it is necessary to deploy the airbag cushion 20 (e.g., during a vehicle collision or other impact on the vehicle) when the airbag cushion 20 is mounted within the interior space 162. The tear line T may be formed on the front end surface of the interior space 162 in various forms.

Hereinafter, the above airbag cushion 20 will be described with reference to various exemplary embodiments. As illustrated in FIG. 1, an airbag cushion 20 according to a first exemplary embodiment may include a guide tube 21 mounted within the cushion housing 10 and may be deployed along the seatbelt 12 by the gas supplied thereto from the inflator I to surround the seatbelt 12, and first and second chambers 22 and 23 connected to the guide tube 21 to communicate therewith, may be inflated by the gas supplied thereto from the guide tube 21, and may be positioned corresponding to the respective shoulder and hip of the occupant H or other injury vulnerable locations of an occupant in the state in which the guide tube 21 is deployed along the seatbelt 12. In particular, since the guide tube 21 provides a path in which gas flows, the guide tube 21 may be formed to have a minimal thickness required for the first and second chambers 22 and 23 which substantially restrain the occupant H. Thus, it may be possible to protect and restrain the occupant H with more safely.

Further, the airbag cushion 20 may include the guide tube 21 and the first and second chambers 22 and 23. The guide tube 21 provides the path in which the gas supplied from the inflator I may flow. The first and second chambers 22 and 23 may be inflated by the gas supplied thereto from the guide tube 21. A controller may be provided to operate the inflator to adjust the amount of gas supplied thereto, but the present invention is not limited thereto. In other words, the guide tube 21 may be hollow with a first end connected to the inflator I for supply of gas from the inflator I to the guide tube 21 and with a second end closed, and may surround the seatbelt 12 as the seatbelt 12 passes through the guide tube 12. Thus, the seatbelt 12 may be in direct contact with the occupant H since the guide tube 21 may be mounted within the cushion housing 10 when the airbag cushion 20 is not deployed. Additionally, when the airbag cushion 20 is deployed, the guide tube 21 may be withdrawn from the cushion housing 10 to be deployed along the seatbelt 12. When the guide tube 21 is deployed along the seatbelt 12, the guide tube 21 may surround the seatbelt 12. Consequently, the seatbelt 12 may be prevented from being in direct contact with the occupant H, the first and second chambers 22 and 23 may be positioned to correspond to the respective shoulder and hip of the occupant H, and the guide tube 21 provides the gas flow path to supply the gas to the first and second chambers 22 and 23.

Particularly, the first and second chambers 22 and 23 may be positioned to correspond to the respective shoulder and hip of the occupant H by the guide tube 21, and may be inflated by the gas supplied thereto from the guide tube 21, thereby enabling the shoulder and hip of the occupant H to be locally supported. Since the first chamber 22 supports the shoulder of the occupant H and the second chamber 23 supports the hip of the occupant H, it may be possible to minimize an injury to the occupant H due to the pressure of the seatbelt 12 in the event of vehicle collision. In addition, it may be possible to secure or control an inflation speed and reduce an amount of gas by the local inflation of the first and second chambers 22 and 23.

The first chamber 22 may be positioned in front of the shoulder of the occupant H in the guide tube 21 and the second chamber 23 may be positioned in front of the hip of the occupant H in the guide tube 21. The first and second chambers 22 and 23 may be connected to the guide tube 21 to communicate therewith through respective vent apertures 24. As illustrated in FIG. 4, the first and second chambers 22 and 23 may be inflated by the gas supplied thereto from the guide tube 21 through the vent apertures 24. In addition, when the airbag cushion 20 is deployed, the first chamber 22 may be positioned in front of the shoulder of the occupant H and the second chamber 23 may be positioned in front of the hip of the occupant H. Therefore, in the event of vehicle collision, it may be possible to prevent the upper body of the occupant H from excessively moving forward and minimize an injury to the occupant H due to the pressure of the seatbelt 12.

Meanwhile, the inflator may be installed on the rear surface of the seat back S, and may include a gas distribution passage I10 that extends from the inflator I to be connected to the guide tube 21 to supply gas to the guide tube 21 within the cushion housing 10. Particularly, the inflator I may be mounted within the cushion housing 10, and thus, the overall size of the cushion housing 10 may be increased to secure the installation space of the inflator I. Therefore, the inflator I may be installed on the rear surface of the seat back S. In addition, gas may be supplied from the inflator I to the guide tube 21 through the gas distribution passage I10. In other words, since the gas supplied from the inflator I installed on the rear surface of the seat back S flows to the guide tube 21 through the gas distribution passage I10, the first and second chambers 22 and 23 may be inflated together with the guide tube 21.

In the airbag cushion 20 according to the first exemplary embodiment, since the gas supplied from the inflator I flows to the guide tube 21 through the gas distribution passage I10, the guide tube 21 may be withdrawn forward from the cushion housing 10 and may be deployed along the seatbelt 12. The first and second chambers 22 and 23 may be inflated by the gas supplied thereto from the guide tube 21 deployed along the seatbelt 12, and thus, the gas may be first supplied to the first chamber 22. Thus, after the shoulder of the occupant H is first supported by the first chamber 22, the second chamber 23 may be inflated to support the hip of the occupant H. Therefore, when the upper body of the occupant H is moved forward by inertia in the event of vehicle collision, the first chamber 22 may be inflated first to support the shoulder of the occupant H. Consequently, it may be possible to rapidly restrain the movement of the occupant H and minimize an injury to the occupant H due to the pressure of the seatbelt 12 to the shoulder of the occupant H.

Meanwhile, as illustrated in FIGS. 5 and 6, an airbag cushion 20 according to a second exemplary embodiment may include a distribution tube 25 mounted within the cushion housing 10 and deployed along the seatbelt 12 by the gas supplied thereto from the inflator I to surround the seatbelt 12, a third chamber 26 connected to the distribution tube 25 to communicate therewith, may be inflated by the gas supplied thereto from the distribution tube 25, and may be positioned in front of the hip of the occupant H, and a fourth chamber 27 connected to the distribution tube 25, may be inflated by the gas supplied thereto from the inflator I, and may be positioned in front of the shoulder of the occupant H. However, the present invention is not limited thereto and the chambers may be positioned to correspond to other areas along the seat back where an occupant may be vulnerable or susceptible to injury due to the pressure from the seatbelt when forcefully pushed forward during an impact.

In other words, the distribution tube 25 provides a path in which the gas supplied from the inflator I may flow, the third chamber 26 may be inflated by the gas supplied thereto from the distribution tube 25, and the fourth chamber 27 may be inflated by the gas directly supplied to the inflator I. Thus, the fourth chamber 27 positioned in front of the shoulder of the occupant H may be inflated by the gas directly supplied to the inflator I, thereby securing and controlling an inflation speed. The third chamber 26 may be inflated by the gas supplied from the distribution tube 25 thereto to support the hip of the occupant H.

Accordingly, the inflator I may be installed on the rear surface of the seat back S, and may have a first gas distribution passage I20 that extends from the inflator I to be connected to the distribution tube 25 within the cushion housing 10, and a second gas distribution passage I30 that branches from the first gas distribution passage I20 to be connected to the fourth chamber 27. In addition, the second gas distribution passage I30 may branch and extend from the first gas distribution passage I20 into a plurality of passages, and the branched passages may be connected around the distribution tube 25 in a separate state.

As illustrated in FIGS. 6 and 7, the gas supplied from the inflator I may flow to the distribution tube 25 and the third and fourth chambers 26 and 27 through the first and second gas distribution passages I20 and I30 to inflate the distribution tube 25 and the third and fourth chambers 26 and 27. Particularly, since the second gas distribution passage I30 branching and extending from the first gas distribution passage I20 may be connected to the fourth chamber 27, the gas supplied from the inflator I may first flow to the fourth chamber 27 together with the distribution tube 25, thereby enabling the fourth chamber 27 to be deployed more rapidly. In addition, since the second gas distribution passage I30 branches into a plurality of passages, it may be possible to further secure or control the inflation speed of the fourth chamber 27.

Accordingly, in the event of vehicle collision, the distribution tube 25 and the fourth chamber 27 may be inflated by the gas supplied thereto and thus, the shoulder of the occupant H may be first supported by the fourth chamber 27. Further, the distribution tube 25 may be deployed along the seatbelt 12 to position the third chamber 26 at the hip of the occupant H to support the hip of the occupant H. Therefore, when the upper body of the occupant H is moved forward by inertia in the event of vehicle collision, the fourth chamber 27 may be inflated first to support the shoulder of the occupant H to restrain the occupant H more rapidly and the third chamber 26 supports the hip of the occupant H. Consequently, it may be possible to minimize an injury to the occupant H due to the pressure of the seatbelt 12. In addition, it may be possible to secure or control an inflation speed and reduce an amount of gas by the local inflation of the third and fourth chambers 26 and 27.

The seatbelt airbag for a vehicle having the above-mentioned structure may be inflated in the seatbelt 12 for restraining the occupant H to reduce an injury to the occupant H caused by the seatbelt 12. Particularly, since the airbag may be locally inflated at the occupant's shoulder and hip susceptible to substantial injury by the seatbelt 12, it may be possible to secure an inflation speed, minimize an impact, and rapidly and stably restrain the occupant H in the seat.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:
1. A seatbelt airbag for a vehicle, comprising:
a cushion housing installed at an upper portion of a seat back and having a seatbelt that extends diagonally across the seat back to protect a shoulder of an occupant across a chest thereof to a hip thereof; and
an airbag cushion mounted within the cushion housing, deployed along the seatbelt by gas supplied thereto from an inflator, and having a plurality of chambers that are positioned to correspond to the diagonal extension of the seatbelt to prevent the seatbelt from coming into direct contact with the occupant in the event of vehicle collision,
wherein the cushion housing includes:
an inner case fixedly installed at the upper portion of the seat back and connected with the seatbelt to guide an extension path of the seatbelt; and a front case coupled to a front surface of the inner case, the airbag cushion folded within the front case and being opened at a front surface thereof when the airbag cushion is deployed, and wherein the inner case is formed with a guide ring to which the seatbelt is latched while passing therethrough, and a rear case is coupled to the rear of the inner case to cover the inner case by the front and rear cases to prevent exposure to the outside.

2. The seatbelt airbag according to claim 1, wherein the chambers correspond to the shoulder and chest areas of the occupant.

3. The seatbelt airbag according to claim 1, wherein the seatbelt has a first end connected to a retractor installed at a rear lower portion of the seat back to allow the seatbelt to be wound by the retractor, and has a second end formed with a tongue to fasten the seatbelt to a buckle installed at a front lower portion of the seat back.

4. The seatbelt airbag according to claim 1, wherein the front case includes an opening aperture open in forward and backward directions for passing the seatbelt therethrough, and an interior space in which the airbag cushion is folded around the opening aperture, and a tear line is formed on a front end surface of the interior space to deploy the airbag cushion forward by tearing the tear line in the deployment of the airbag cushion.

5. The seatbelt airbag according to claim 2, wherein the airbag cushion includes:
 a guide tube mounted within the cushion housing and deployed along the seatbelt by gas supplied thereto from the inflator to surround the seatbelt; and
 first and second chambers connected to the guide tube to communicate therewith to be inflated by gas supplied thereto from the guide tube, and positioned to correspond to the respective shoulder and hip of the occupant when the guide tube is deployed along the seatbelt.

6. The seatbelt airbag according to claim 5, wherein the first chamber is positioned in front of the shoulder of the occupant in the guide tube, the second chamber is positioned in front of the hip of the occupant in the guide tube, and the first and second chambers are connected to the guide tube to communicate therewith through respective vent apertures.

7. The seatbelt airbag according to claim 5, wherein the guide tube is hollow with a first end connected to the inflator for supply of gas from the inflator to the guide tube and a closed second end.

8. The seatbelt airbag according to claim 7, wherein the inflator is installed on a rear surface of the seat back, and includes a gas distribution passage that extends from the inflator to be connected to the guide tube for supply of gas to the guide tube within the cushion housing.

9. The seatbelt airbag according to claim 5, wherein the airbag cushion includes:
 a distribution tube mounted within the cushion housing and deployed along the seatbelt by gas supplied thereto from the inflator to surround the seatbelt;
 a third chamber connected to the distribution tube to communicate therewith to be inflated by gas supplied thereto from the distribution tube, and positioned in front of the hip of the occupant; and
 a fourth chamber connected to the distribution tube to be inflated by gas supplied from the inflator thereto, and positioned in front of the shoulder of the occupant.

10. The seatbelt airbag according to claim 9, wherein the inflator is installed on a rear surface of the seat back, and having a first gas distribution passage that extends from the inflator to be connected to the distribution tube within the cushion housing, and a second gas distribution passage that branches from the first gas distribution passage to be connected to the fourth chamber.

11. The seatbelt airbag according to claim 9, wherein the inflator includes a second gas distribution passage that branches and extends from a first gas distribution passage into a plurality of passages, and the plurality of passages are connected around the distribution tube in a separate state.

* * * * *